Feb. 20, 1934. E. A. FIELD 1,947,702
FLOWER HOLDER
Filed Jan. 16, 1933 2 Sheets-Sheet 1

INVENTOR
Ethel A. Field
BY
Austin & Dix
ATTORNEYS

Feb. 20, 1934.  E. A. FIELD  1,947,702
FLOWER HOLDER
Filed Jan. 16, 1933   2 Sheets-Sheet 2
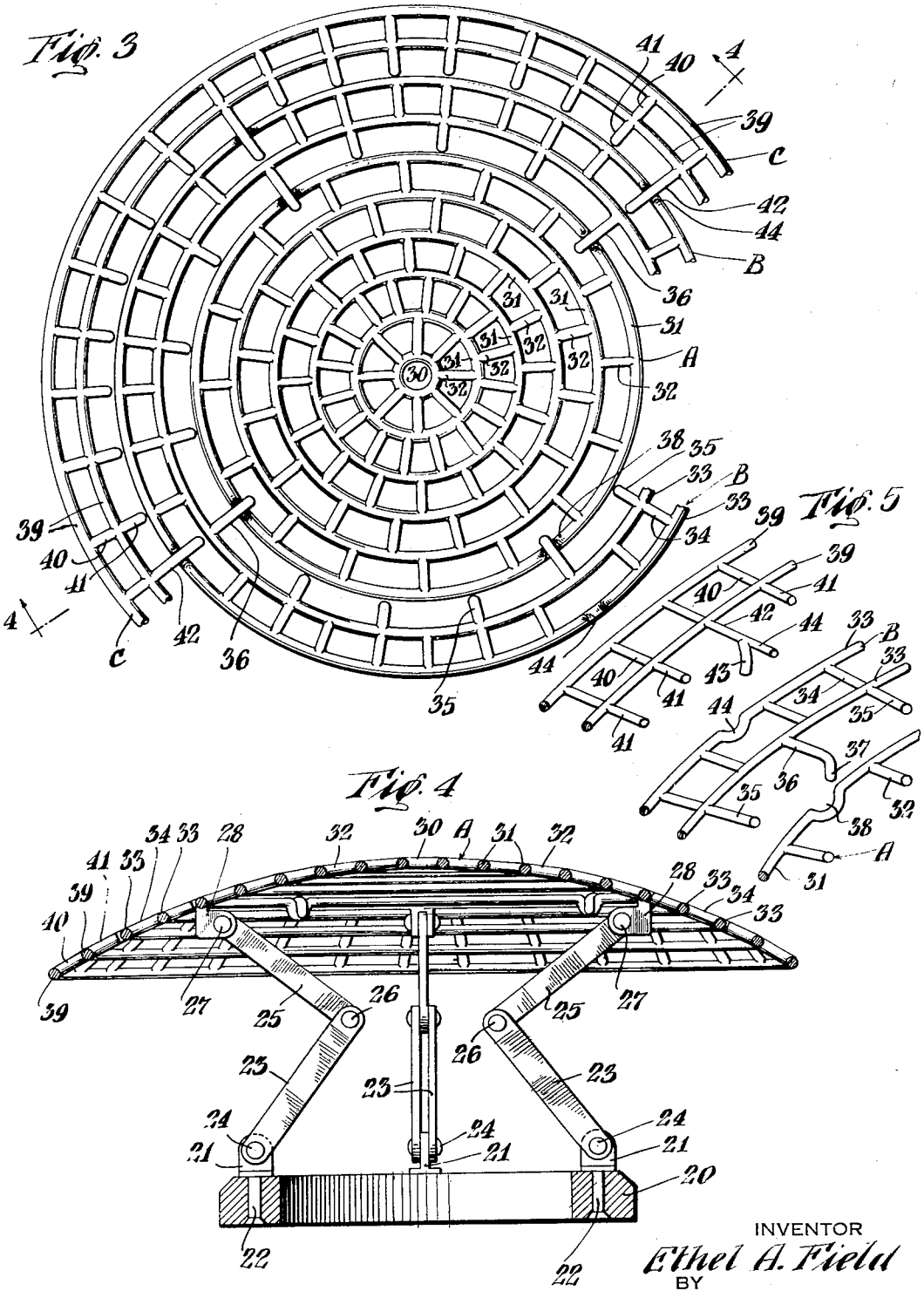
INVENTOR
Ethel A. Field
BY
Austin & Dix
ATTORNEYS Patented Feb. 20, 1934

1,947,702

UNITED STATES PATENT OFFICE 1,947,702

FLOWER HOLDER

Ethel A. Field, New York, N. Y.

Application January 16, 1933. Serial No. 651,966

12 Claims. (Cl. 47—41)

This invention relates to flower holders and more particularly to a holder adapted to support natural or artificial flowers or other decorative objects in attractive display position.

The flower holder forming the subject matter of this invention comprises generally a frame member having a series of openings therein adapted to receive the stem of one or more flowers. The openings are arranged in such a manner as to locate the flowers positioned therein in artistic bouquet arrangement. The frame may be formed of metal or other suitable material and may assume a variety of attractive designs and patterns. The frame is supported on a weighted base which maintains the frame in its proper upright position at all times. The base is preferably provided with a central opening which receives the lower end of the flower stems and assists in supporting the flowers in their decoratively arranged position. Adjustable legs are provided which connect the frame to the weighted base portion. The legs are so joined that the frame may be raised and lowered to accommodate the flower stem lengths and to give the bouquet the most attractive arrangement. The legs are also so made that the frame may be positioned in horizontal or tilted position, permitting further decorative variations and effects. The flower supporting frame may be made in sections, the sections being adjustable and detachable to modify the size and shape of the frame. The flower holder is adapted to support either natural or artificial flowers or other attractive objects used for decorative purposes. The flower holder may be positioned in a dish or other receptacle and the same adjusted in position to support the flowers within the holder and dish in a natural and attractive arrangement.

An object of this invention is to provide a flower holder adapted to support natural or artificial flowers or similar objects in attractive display position.

Another object of this invention is to provide a flower holder which is vertically and angularly adjustable to accommodate the flowers supported therein and to support them in attractive, decorative display.

Another object of this invention is to provide a flower holder of sectional construction to permit changes in the size and shape of the holder as found convenient and desirable.

Still another object of this invention is to provide a flower holder which is well balanced, which is attractive in itself and which may be used either independently of or positioned within a suitable flower dish, which is strong and sturdy in construction, inexpensive to manufacture, and which may be made up into a variety of designs and patterns to present an attractive bouquet display of the flowers or objects supported therein.

Other objects of this invention will become apparent as the disclosure proceeds.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a top view of my novel flower holder;

Fig. 3 is a top view of a flower holder having a flower holding frame of sectional construction;

Fig. 4 is a vertical cross sectional view of the flower holder shown in Fig. 3, this view being taken on line 4—4 of Fig. 3; and Fig. 5 is an enlarged fragmentary cross sectional view of the sectional parts of the flower holding frame shown in Figs. 3 and 4, this view illustrating more particularly the means used for removably connecting the sections.

Similar reference characters refer to similar parts throughout the several views of the drawings.

Figure 1:
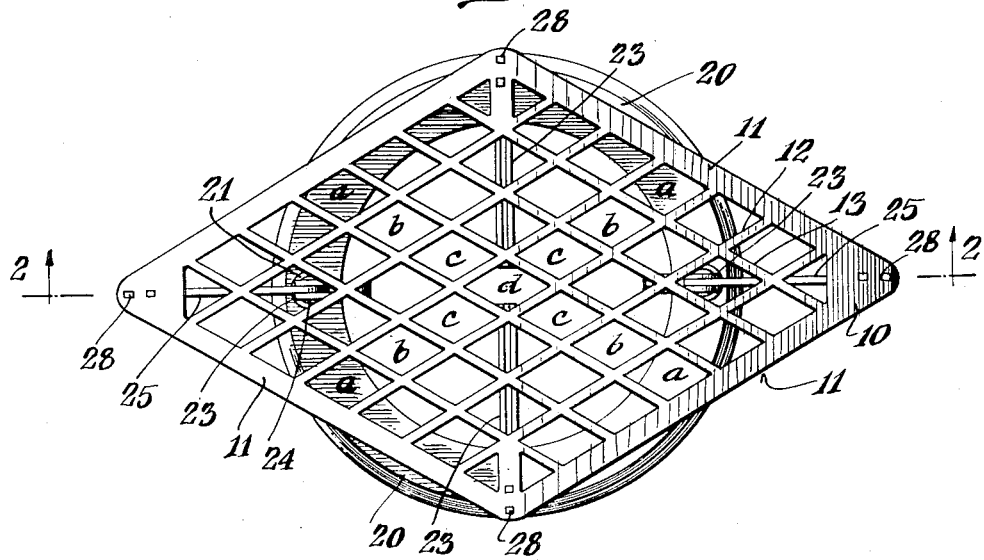
Figure 2:
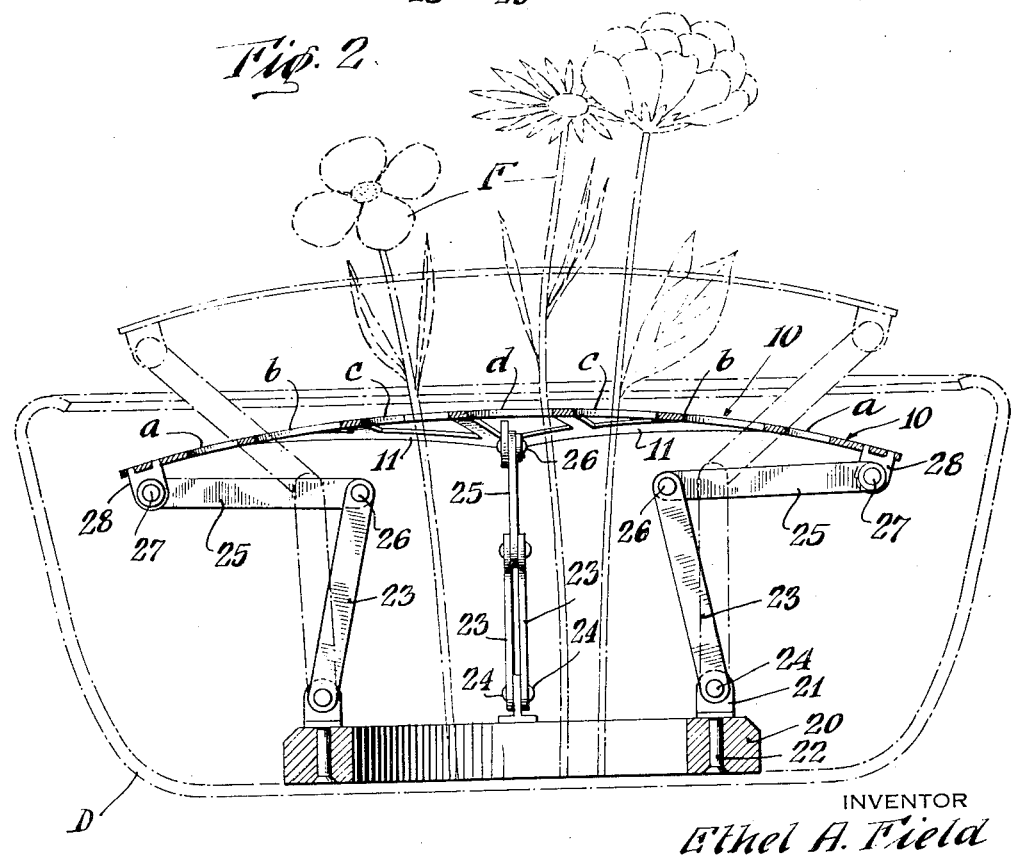
Fig. 2 is a side view of the flower holder shown in Fig. 1 as it appears when positioned in a dish with flowers positioned therein, the flower holder being shown in one position in dotted lines to illustrate the vertical and angular adjustability thereof.

The flower holder as shown in Figs. 1 and 2 comprises a flower holding frame 10 of diamond shape supported by jointed legs from a weighted base member 20. The flower holding frame may comprise a sheet metal stamping having concentric rows of openings $a$, $b$ and $c$ therein, and a central opening $d$ therein, as shown more particularly in Fig. 1. The flower holding frame 10 may comprise a border structure 11 having strips 12 and 13 crossing each other at an angle and laced between the border structure 11, thus defining the flower receiving openings $a$, $b$, $c$ and $d$ therebetween. The flower receiving openings are preferably arranged in concentric rows so that different flowers may be placed in different rows to produce an artistic design. It is understood, however, that this invention is not limited to the concentric arrangement of the openings since the openings may be arranged in any manner to produce the desired artistic effect when the flowers are arranged therein. The flower holding frame is preferably slightly curved in contour, as shown more particularly in Fig. 2, permitting the flowers to be more conveniently arranged therein. The flower holding frame may be inexpensively made by a stamping operation which cuts the flower holding frame into the desired form, bends the same into an arched contour and cuts or punches out the flower receiving openings a, b, c and d therein, all in a single operation.

The flower holder is preferably supported by means of a weighted base which comprises a heavy ring 20 of metal or other heavy material. The ring 20 may be given any desired artistic contour or shape and is preferably provided with a central opening which receives the lower ends of the flower stems positioned within the holder. The diametric size of the ring may vary, depending upon the stability required and the weight of the base itself.

The flower holding frame 10 is adjustably supported from the base 20 by means of jointed legs which may comprise the paired parts 23 to which the upper part 25 is hingedly connected by means of a pin 26. The lower end of the paired parts 23 are hinged to a pin 24 connected to a knuckle 21 secured to the base 20 by means of a rivet 22 or other securing means. The upper end of the part 25 is connected to the frame by means of a knuckle 28 and a connecting rivet 27. The pins 24, 26 and 27 should frictionally bind the jointed parts together sufficiently so as to require a predetermined force or pressure to adjust the legs. Any desired number of jointed legs may be provided to properly support the flower holding frame 10 and to permit vertical and angular adjustment thereof. The knuckle 28 joining the legs 25 to the frame 10 may be of the pintle, swivel, ball and socket, or other well-known type of connection permitting angular and vertical adjustment of the frame. It is also understood that this invention is not limited to the particular form of jointed legs shown in the figures, but other well known adjustable or jointed legs and supports adaptable for the purpose are considered within the purview of this invention.

I have shown in Figs. 3, 4 and 5 a modified form of flower holding frame which comprises generally a plurality of detachable sections which permits variations in the size and contour of the flower holding frame. The frame as shown may be made from a stamping, or wire, welded or otherwise secured together. This flower holding frame comprises a center section A which is permanently secured to the adjustable legs by means of the knuckles 28 and pins 27. The center section may comprise a center part 30 having a plurality of concentric rings 31 surrounding the same. The center part 30 and the rings 31 may be connected by means of radiating spokes or bars 32 which define flower receiving openings therebetween.

An intermediate flower holding section B, comprising concentric rings 33 connected together by means of the radiating spokes 34, is adapted to be detachably connected to the center section A. I have shown for purposes of illustration one means which may be used for detachably connecting the sections A and B. This means comprises a plurality of inwardly projecting bars 36 having hook portions 37 on the ends thereof which are adapted to rest within recesses 38 provided in the outmost ring 31 of the central section. Inwardly extending spokes or bars 35 positioned between the bars 36 divide the area between the rings 31 and 33 into suitable flower receiving openings so that when the intermediate section B is joined to the central section A, a flower holder having the desired number and arrangement of flower receiving openings is presented.

An outer section C may also be provided which comprises the concentric rings 39 connected together by the radiating spokes 40. The outer section C is also provided with inwardly extending bars 42 having hooks 43 thereon provided. Recesses 44 are provided in the outermost ring 33 of the intermediate section B to receive the correspondingly inwardly extending bar 42 of the outer section C. The inwardly extending bars 42 and the hooks 43 serve to detachably connect and support the outer section C from the intermediate section B. Inwardly projecting bars 41 positioned intermediate the connecting bars 42 may also be provided to divide the space between the rings 33 and 39 into suitable flower receiving openings.

Any number of detachable sections may be provided and when detachably connected together a flower holding frame of the desired contour, shown more particularly in Fig. 4, is provided. A flower holding frame comprising detachable sections gives the device greater flexibility in use since bouquets of different sizes and arrangements may be displayed. The flower receiving openings may be arranged in any manner to give the desired flower distribution within the bouquet. The various sections comprising the flower receiving frame may also be given any desired shape or contour to produce the desired artistic effect.

The flower holder as thus made may be inexpensively made and economically produced. The flower receiving frame as well as the weighted base and adjustable supporting legs may be made from any metal such as bronze, aluminum, steel, nickel, wrought iron, or from bakelite, composition, or paperboard material. The device may be made into any artistic shape or contour, such as a diamond, heart, club or spade, useful as novelty decoration at card parties. Either natural or artificial flowers or other objects in a variety of artistic arrangements may be supported thereby. The holder itself may be placed within a dish or other receptacle D, as shown in Fig. 2, and the flower receiving frame adjusted in position to present the flowers therein in the most artistic arrangement within the dish. The flower receiving frame as well as the base and adjustable legs may be made in any desired shape or size. It is thus seen that a flower holder is presented which is flexible to accommodate various arrangements of flowers of different sizes. The flower holder may be inexpensively produced from a large variety of metallic, composition and fibrous materials.

While certain novel features of the invention have been disclosed and are pointed out in the annexed claims, it will be understood that various omissions, substitutions and changes may be made by those skilled in the art without departing from the spirit of the invention.

What is claimed is:

1. A flower holder of the character described comprising a frame having a plurality of concentrically arranged openings therein adapted to receive a plurality of flowers and support the same in decorative bouquet arrangement, and jointed means for vertically adjusting said frame to accommodate the flowers displayed.

2. A flower holder of the character described comprising a frame having a plurality of concentrically arranged openings therein adapted to receive a plurality of flowers and support the same in decorative bouquet arrangement, and jointed means for vertically and angularly adjusting said frame to accommodate the flowers displayed.

3. A flower holder of the character described comprising a weighted base portion having an opening adapted to receive the ends of the flower stems, a frame having a plurality of openings therein adapted to support the flowers in decorative bouquet arrangement and a plurality of adjustable legs extending from said base portion and adjustably supporting said frame, said legs being separately adjustable to retain the frame in a plurality of different vertical and angular positions.

4. A flower holder of the character described comprising a weighted base portion having means adapted to receive the ends of the flower stems, a flower receiving frame having a plurality of concentrically arranged openings therein, and a plurality of spaced adjustable legs connecting said frame and base portion operative to permit vertical adjustment of the frame to accommodate the flowers displayed.

5. A flower holder of the character described comprising a weighted base portion, an open mesh flower receiving frame, and jointed means connecting said frame and base portion operative to permit vertical and angular adjustment of the frame to accommodate the flowers displayed.

6. A flower holder adapted to support flowers in decorative bouquet arrangement comprising a flower receiving frame, said frame comprising separable and removable sections for increasing or decreasing extent of said frame, each section having a flower receiving opening therein.

7. A display holder for natural or artificial flowers comprising a frame having a plurality of concentrically arranged flower receiving openings therein, and a weighted stem receiving base portion and adjustable jointed supports connecting said frame to said base portion.

8. A flower holder comprising a frame, a weighted base portion, and adjustable means comprising jointed legs connecting said frame and base portion and permitting vertical and angular adjustment of the frame to accommodate the flowers displayed therein.

9. A flower holder adapted to be positioned within a flower receiving dish comprising a frame, a weighted stem receiving base portion positioned within said dish, and vertical adjustable means connecting said frame and base portion, said frame comprising detachable sections, said sections having openings therein adapted to receive and support a plurality of flowers decoratively arranged in bouquet form.

10. A flower holder adapted to be positioned within a flower receiving dish comprising a frame, a weighted base portion positioned within said dish, and adjustable means comprising jointed legs connecting said frame and base portion permitting vertical adjustment of the frame, said frame having openings adapted to receive and support a plurality of flowers in decorative bouquet arrangement.

11. A flower holder adapted to be positioned within a flower receiving dish comprising a frame, a weighted base portion positioned within said dish, vertical and angular adjustable means connecting said base and frame, said frame including separable and detachable sections having flower receiving openings therein.

12. A flower holder adapted to be positioned within a flower receiving dish, comprising a flower receiving frame, a weighted base portion receiving the flower stems positioned within said dish, means connecting said base and frame, said frame comprising detachable and removable sections, each section having flower receiving openings therein.

ETHEL A. FIELD.